(12) United States Patent
Grinberg et al.

(10) Patent No.: US 8,872,113 B2
(45) Date of Patent: Oct. 28, 2014

(54) SYSTEM TO TEST PERFORMANCE OF PIXELS IN A SENSOR ARRAY

(75) Inventors: Anatoly G. Grinberg, Brighton, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 428 days.

(21) Appl. No.: 13/401,384

(22) Filed: Feb. 21, 2012

(65) Prior Publication Data

US 2013/0214167 A1    Aug. 22, 2013

(51) Int. Cl.
*G01J 5/02*      (2006.01)
*G01D 18/00*   (2006.01)

(52) U.S. Cl.
USPC ........................................ 250/353; 250/252.1

(58) Field of Classification Search
USPC .............................................. 250/353, 252.1
See application file for complete search history.

(56) References Cited

U.S. PATENT DOCUMENTS

| | | | | |
|---|---|---|---|---|
| 4,544,843 | A * | 10/1985 | Kern et al. | 250/239 |
| 4,623,788 | A * | 11/1986 | Kern et al. | 250/227.11 |
| 6,888,572 | B1 | 5/2005 | Kozlowski | |
| 7,081,614 | B2 * | 7/2006 | Duncan et al. | 250/252.1 |
| 7,355,179 | B1 * | 4/2008 | Wood et al. | 250/339.11 |
| 7,626,403 | B2 * | 12/2009 | Ou et al. | 324/754.23 |
| 2011/0268453 | A1 * | 11/2011 | Fest et al. | 398/129 |

* cited by examiner

*Primary Examiner* — Christine Sung
(74) *Attorney, Agent, or Firm* — Boyle Fredrickson, S.C.

(57) ABSTRACT

A system to test operation of an optical sensor is disclosed. The optical sensor includes one or more photosensitive devices configured to convert light to electrical signals. A test light source and a reference target are included within the housing of the optical sensor. The test light source is mounted proximate to the photosensitive devices and the reference target is positioned opposite from the test light source. The test light source is periodically pulsed on to emit light at a known wavelength. The light is reflected from the reference target back to at least a portion of the photosensitive devices. A logic circuit uses the reflected light which is received at the portion of the photosensitive devices to determine the distance between the light source and the reference target. This calculated distance is compared against the known distance to verify correct operation of the optical sensor.

20 Claims, 2 Drawing Sheets

SYSTEM TO TEST PERFORMANCE OF PIXELS IN A SENSOR ARRAY

BACKGROUND OF THE INVENTION

The subject matter disclosed herein relates to an optical sensor used in a safety system and, more specifically, to a system to test performance of the optical receiver used in the optical sensor.

An optical sensor includes a receiver that converts light incident to the sensor into an electric signal. The receiver may include a single photosensitive device or an array of pixels, for example charge-coupled devices (CCD) or complementary metal-oxide-semiconductor (CMOS) sensors. Each pixel converts the light incident to that pixel to a separate electrical signal. The optical sensor typically has an opening through which the light passes and may further include a lens or optical filter over the opening to focus the light on the detector. Depending on the application requirements and the configuration of the sensor, the optical sensor is suited for a variety of uses ranging from indicating the presence of a beam of light to reproducing a three dimensional (3D) image of an object.

It is known that the sensitivity of the receivers changes over time. Although variation in the rate of change for individual pixels naturally occurs, on average the performance of the pixel array will change at a generally uniform rate. By sampling the performance of a portion of the pixel array, the condition of the entire array may be monitored without being susceptible to variations from individual pixels. The performance of the detector may be tested by directing a reference light source toward a portion of the pixel array to be tested and measuring the resulting electrical signals. Comparing the resulting electrical signals to an expected value can be used to detect changes in the performance of the sensor.

However, optical sensors are often used in applications that are not conducive to supplying a reference light for testing of the sensor. For example, the sensor may be a component of a safety system such as a light curtain or a 3D camera monitoring access to or operation of an industrial machine or process line. The machine or process line may operate on a near-continuous basis with periodic maintenance scheduled on a monthly or even less frequent interval. Because the safety system is typically protecting an operator from a potentially hazardous operating region or condition, industrial standards require more frequent monitoring of the operating performance than achieved by periodic maintenance alone.

Thus, it would be desirable to provide a system that regularly tests operation of the sensor without interrupting normal operation of the sensor.

BRIEF DESCRIPTION OF THE INVENTION

The subject matter disclosed herein describes a method and apparatus to test operation of an optical sensor for use in a safety system. The optical sensor includes one or more photosensitive devices configured to convert light to electrical signals. A test light source and a reference target are included within the housing of the optical sensor. The test light source is mounted, proximate to the photosensitive devices and the reference target is positioned opposite from the test light source. The test light source is periodically pulsed on to emit light at a known wavelength. The light is reflected from the reference target back to at least a portion of the photosensitive devices. A logic circuit uses the reflected light which is received at the portion of the photosensitive devices to determine the distance between the light source and the reference target. This calculated distance is compared against the known distance to verify correct operation of the optical sensor.

According to one embodiment of the invention, an optical sensor for use in safety systems includes a housing and an optical receiver mounted within the housing. An optical source is mounted within the housing and configured to emit radiation at a wavelength to be received by at, least a portion of the optical receiver. A logic circuit is configured to receive at least one signal from the portion of the optical receiver corresponding to the radiation received by the portion of the optical receiver and to determine a value corresponding to either a time for the light to travel from the light source to the portion of photodetectors or a distance between the light source and the portion of photodetectors as a function of the signals received from the portion of the optical receiver. The logic circuit compares the value to a predetermined threshold and generates a signal if the value exceeds the predetermined threshold.

According to another embodiment of the invention, a method of verifying operation of an optical sensor used in a safety system is disclosed. The optical sensor has a plurality of receiving elements and a light source mounted within a housing. The light source emits radiation at a wavelength at a first periodic interval. The radiation is received at a first portion of the receiving elements. A value corresponding to either a time for the light to travel from the light source to the first portion of the receiving elements or a distance between the light source and the first portion of the receiving elements is determined as a function of the radiation received from the first portion of the receiving elements. The value is compared to a predetermined threshold, and a signal is generated if the value exceeds the predetermined threshold.

According to yet another embodiment of the invention, an optical sensor system for use in a safety system includes a first light source configured to transmit light in a defined path and an optical sensor unit. The optical sensor unit includes a housing having an opening positioned to receive light from the first light source either directly along the defined path or reflected from an object passing through the defined path. An array of receiving elements mounted within the housing receives the light entering through the opening. A reference target is interior to the housing and adjacent to the opening, and a test light source is configured to transmit light toward the reference target, which in turn reflects the light toward a portion of the array of receiving elements. A controller in communication with each of the first light source, the test light source, and the array of receiving elements is configured to periodically transmit light from either the first light source or the test light source, detect the presence of the light from either the first light source or the test light source at the array of receiving elements, determine whether an object exists in the defined path if the first light source is transmitting, and evaluate performance of the array of receiving elements as a function of the light transmitted from the test light source if the test light source is transmitting.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
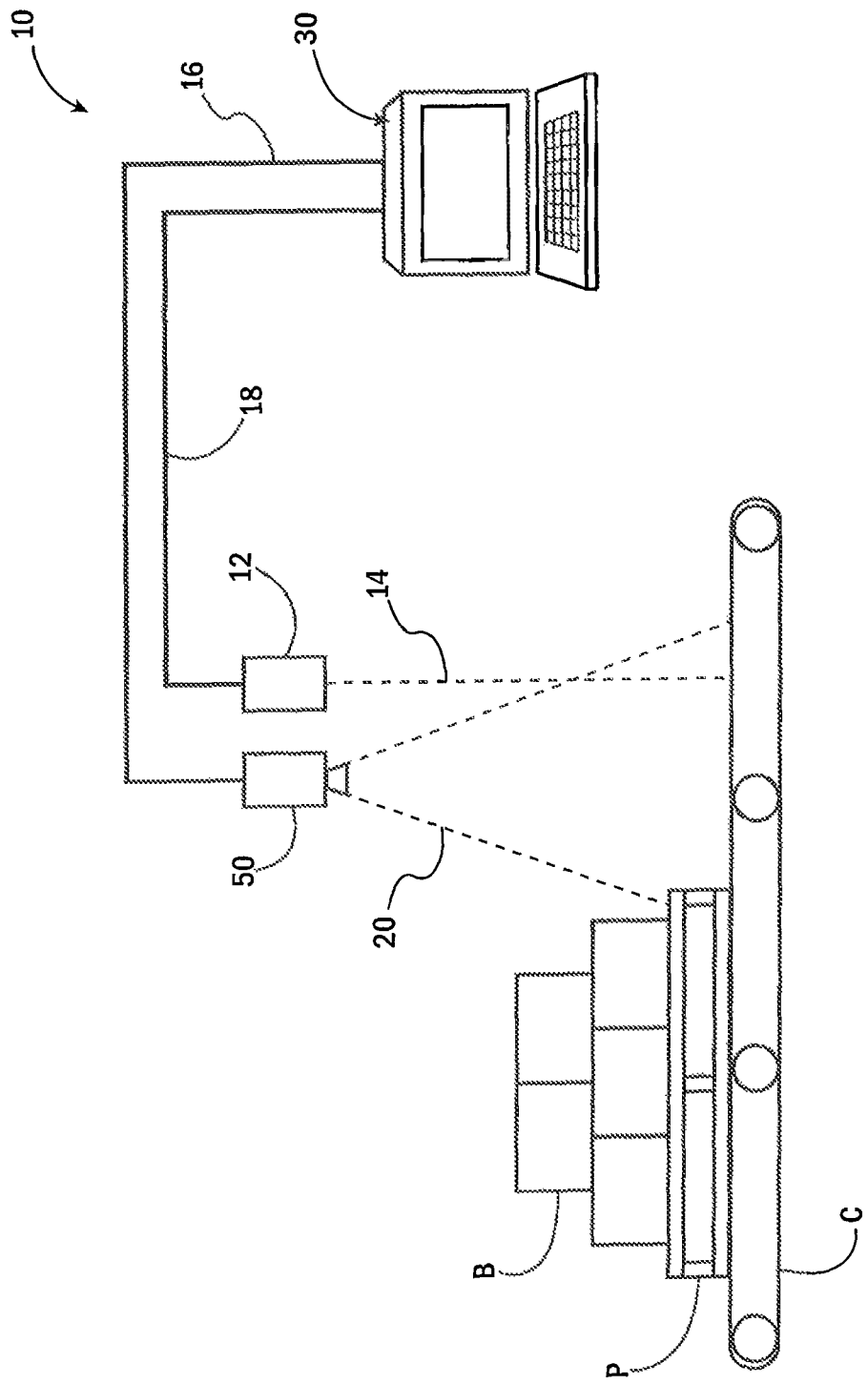
FIG. 1 is a an exemplary environmental view incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an optical sensor system 10 is illustrated operating in an exemplary environment. The optical sensor system 10 includes a first optical source 12 configured to transmit light in a defined path 14. The first optical source 12 may be any suitable source emitting radiation, for example, in the visible or infrared spectrums. The first optical source 12 may be, but is not limited to, a light emitting diode, an infrared diode, or a laser diode. Further, the first optical source 12 may include one or more light sources and, optionally, may include a lens, a filter, or other optical device to direct, focus, or filter, the light being emitted from the source 12. The defined path 14 is, for example, a beam or a plane of light, which is intended to be transmitted to an optical sensor 50 either directly or by reflection, for example, from an object intersecting the defined path 14.

As shown in FIG. 1, the first optical source 12 may emit a plane of light along a defined path 14. Optionally, multiple beams of light may be directed along the path 14. The path 14 intersects a conveyor, C, and is used to detect the presence, or absence, of an object along the conveyor, C. The conveyor, C, may carry a pallet, P, of boxes, B, between two points. The light emitted from the first optical source 12 reflects off the boxes, B, and is detected by the optical sensor 50. The optical sensor 50 converts the light received at the sensor to an electrical signal 16 which is transmitted to a controller 30. The optical sensor 50 is capable of detecting light reflected off objects within its field of view 20. The electrical signal 16 generated by the sensor may be a binary on/off signal indicating the presence or absence of an object within the field of view 20 or, optionally, the electrical signal 16 may be an analog value corresponding to the intensity of light received by the optical sensor 50. The controller 30 uses the electrical signal 16 according to the application requirements, for example, to stop the conveyor, C, if an unexpected object is detected within the predefined path 14 or to reconstruct an image of the boxes, B, and pallet, P, passing through the predefined path 14. According to still another embodiment of the invention, at least a portion of the controller 30 may be incorporated into the optical sensor 50 to directly process the electrical signal 16. In addition, the controller 30 may provide a control signal 18 to the first optical source 12 to control the light emitted.

According to still other embodiments of the invention, the first optical source 12 and the optical sensor 50 may be configured to transmit and receive an optical beam in a defined path 14 configured to cross the path of the conveyor, C, either horizontally or at an, angle and displaced above the conveyor, C. The optical sensor 50 may be configured to normally set the electrical signal 16 indicating it is receiving a beam of light from the optical source 12. The electrical signal 16 is reset if an object intersects the defined path 14. The first optical source 12 may be a single beam or multiple beams of light, defining, for example, a light curtain. Similarly, the light curtain may be arranged horizontally and parallel with the conveyor to detect, for example, an operator reaching across the conveyor or into a protected region. The electrical signal 16 may be used by the controller 30 to disable the conveyor, C, or other mechanical device operating within the protected region upon detection of an object entering the protected region.

Figure 2:
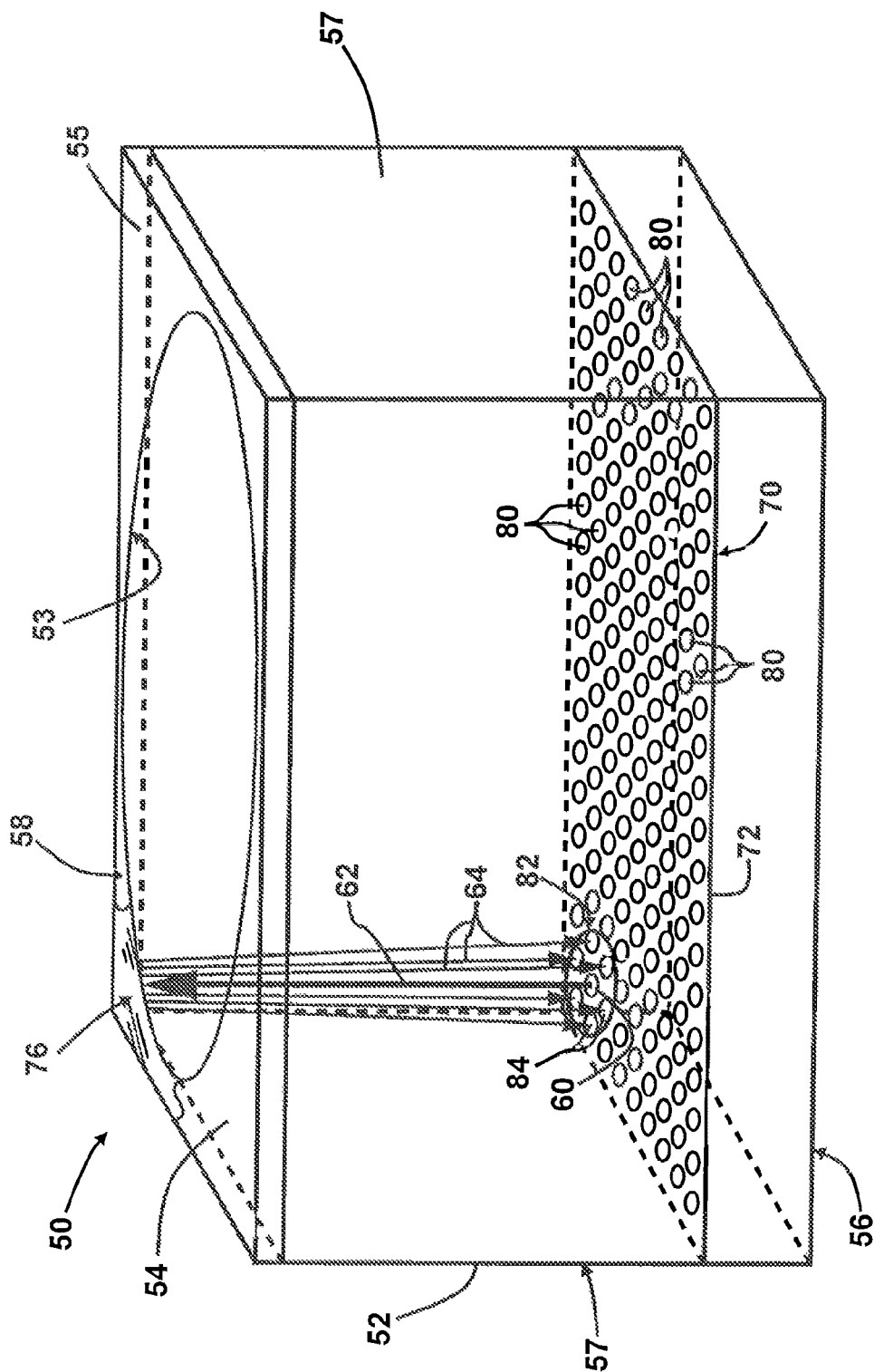
FIG. 2 is a block diagram representation of one embodiment of the present invention.

Referring next to FIG. 2, the optical sensor 50 includes a housing 52 having a front wall 54 and a rear wall 56. The front wall 54 has an interior surface 53, an exterior surface 55, and an opening 58 that extends through the front wall 54 and is configured to allow incident light to pass into the optical sensor 50. An optical receiver 70 is mounted within the housing and configured to receive light incident to the sensor 50. The optical receiver 70 may be mounted, for example, to a substrate 72 proximate to the rear wall 56. The illustrated embodiment is intended to be exemplary and it is further contemplated that the optical sensor 50 may be of numerous shapes and configurations having, for example, no front wall or the optical receiver 70 positioned proximate to the front wall 54 of the sensor 50.

The optical receiver 70 includes at least one photosensitive device 80. The photosensitive device 80 may be, for example, an active pixel sensor (APS), such as a complementary metal-oxide semiconductor (CMOS) sensor, or a passive pixel sensor (PPS) such as a charge coupled device (CCD). The optical receiver 70 may include a single photosensitive device 80 to generate, for example, a binary signal, or an array of photosensitive pixels 80 to reproduce, for example, an image of an object. The optical receiver 70 may require control signals to select a row or column of signals 16 to be read from the array of pixels 80. It is further contemplated that a portion or all of the control functions from the controller 30 may be integrated with the receiver 70 onto an application specific integrated circuit (ASIC).

The optical sensor 50 also includes a second optical source 60 mounted within the housing 52. According to one embodiment of the invention, the second optical source 60 may be mounted on the substrate 72 for the optical receiver 70. Optionally, the second optical source 60 may be mounted on a side wall 57 or at any known position with reference to the housing 52. As still another option, a hole (not shown) may be defined in the substrate 72 and the optical source 60 may be positioned within or behind the hole such that it emits light through the hole in the substrate 72. The second optical source 60 may be, but is not limited to, a light emitting diode, an infrared diode, or a laser diode. The second optical source 60 is configured to emit light, illustrated as ray 62 in FIG. 2, toward a reference target 76 located within the housing 52. The reference target 76 is preferably a reflective material and configured to reflect the light from the second optical source 60 back to a portion 82 of the photosensitive devices 80, illustrated as rays 64.

In operation, the second optical source 60 is used to test operation of the optical receiver 70. The controller 30 generates a control signal to enable the second optical source 60. The second optical source 60 is commanded to emit light rays 62 toward the reference target 76, and the reference target 76 causes reflected light rays 64 to travel toward the portion 82 of the photosensitive devices 80 configured to conduct this test. According to one embodiment of the invention, the time required for the light rays 62 to travel from the second optical source 60 to the reference target 76 and back to the portion 82 of the photosensitive devices 80 is calculated according to time of flight principles as would be known in the art. The time of flight calculations, may be performed in part or in whole within the optical sensor 50, the controller 30, or a combination thereof. Similarly, the distance from the second optical source 60 to the reference target 76 and back to the portion 82 of the photosensitive devices 80 may be calculated. According to still another embodiment of the invention, the light rays 62 may have a predefined wavelength and the phase shift between the emitted light ray 62 and the reflected light ray 64 may be measured.

An indicator signal is generated responsive to the test to indicate the status of the optical receiver 70 to an operator. Because the second optical source 60, reference target 76, and portion 82 of the photosensitive devices 80 configured to conduct the test are provided with a known spatial relationship, any of the calculated values (i.e., the time for the light to travel or the distance from the second optical source 60 to the portion of the photosensitive devices 80 or the phase shift between the transmitted and received radiation) has an expected result under normal operating conditions. A threshold or a range may be selected, for example, as a percentage above and/or below the expected result to indicate that the optical sensor 50 is within an acceptable range of operation. If the calculated value is within the acceptable range, the indicator signal may be set to indicate that the optical receiver 70 is operating normally. If the calculated value is outside the acceptable range, the indicator signal may be reset to indicate that the optical receiver 70 is no longer operating normally. The indicator signal may be transmitted to the controller 30, which, in turn, may use the indicator signal to post a message, operate a lamp, or provide to an operator some other visual or audio indication of the state of the optical receiver 70.

In a safety system, the sensor system 10 may be used, for example, to detect unauthorized entry of a person or object into a restricted area or to detect the presence of a work-piece or part being transferred into a work zone. According to one embodiment of the invention, the optical source 12 may be one or more light beams establishing a light curtain, and each of the beams is received by one or more optical sensor units 50. According to another embodiment of the invention, the optical source 12 may generate a plane of light and the optical sensor unit 50 may be a 3-D camera that generates images of the objects from which the light is reflected. The type of optical source 12 and sensor unit 50 is selected according to the application requirements.

Regardless of the type of optical source 12 and sensor unit 50 selected, testing of the optical sensor system 10 is coordinated with the normal monitoring function of the system 10. A command signal 18 from the controller 30 controls operation of the first optical source 12 which may be continuously enabled any time a particular zone is to be monitored. Optionally, the first optical source 12 may be toggled on and off in coordination with the second optical source 60 mounted within the housing 52 of the optical sensor 50. Another command signal from the controller 30 similarly controls operation of the second optical source 60. The second optical source 60 is enabled during testing of the optical sensor 50 and may be enabled for a short duration to transmit a burst of light from the second optical source 60.

According to one embodiment of the invention, the optical sensor 50 includes an opening 58 in the front wall 54 of the sensor 50. The opening 58 is centrally located in the front wall 54, leaving a portion of the front wall 54 extending around the perimeter of the opening 58. The opening 58 may include a lens, filter, or other optical device configured to receive light from the first optical source 12 and direct the light toward the center of the optical receiver 70. As an option to or in cooperation with the optical device, the front wall 54 blocks at least a portion of the light from entering the outer perimeter of the optical sensor 50. The second optical source 60 may be located in the outer perimeter of the optical receiver 70 and the reference target 76 may be located on the rear surface 53 of the front wall 54. The portion 82 of the photosensitive devices 80 configured to conduct the test is similarly located around the periphery of the optical receiver 70 and may, for example, surround the second optical source 60. Thus, each of the elements used to test operation of the optical receiver are located in a region of the optical sensor 50 that normally receives little incident light, reducing the impact of incident light on the test results. Optionally, the level of incident light may be determined by either a second portion or by the remainder of the optical receiver and used to compensate the test results.

In order to maintain continuous monitoring of a protected region, the test may be interleaved with the monitoring function. The safety requirements of an application typically provide a rate, or cycle time, at which the optical sensor 50 must be sampled to determine the intensity of light received from the first optical source 12 and, thereby, detecting the presence or absence of an object within the protected region. Within this cycle time, the optical sensor 50 must sample the light from the first optical source 12 and conduct any necessary diagnostics or performance checks according to the application requirements. Therefore, during this cycle, the controller 30 provides the control signal 18 to energize the first optical source 12, allows sufficient time for the optical sensor 50 to receive the radiated light, and reads the corresponding signal 16 from the optical sensor 50. The controller 30 may then de-energize the first optical source 12, if needed, and energize the second optical source 60. The second optical source 60 may be energized only long enough to emit a burst of light which, is then reflected from the reference target 76 to the preconfigured portion 82 of the optical receiver 70. The controller then determines the desired value, for example the distance or the time between the second optical source 60, the reference target 76 and the portion 82 of the optical receiver 70 and compares the desired value against the normal operating range. Thus, the normal monitoring function and each of the test functions are each performed within the cycle time of the optical sensor 50.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An optical sensor for use in a safety system, comprising:
a housing;
an optical receiver mounted within the housing;
an optical source mounted within the housing and configured to emit radiation to be received by at least a portion of the optical receiver; and
a logic circuit configured to:
(a) receive at least one signal from the portion of the optical receiver corresponding to the radiation received by the portion of the optical receiver,
(b) determine a value corresponding to either a time for the light to travel from the light source to the portion of photodetectors or a distance between the light source and the portion of photodetectors as a function of the signals received from the portion of the optical receiver,
(c) compare the value to a predetermined threshold, and
(d) generate a signal if the value exceeds the predetermined threshold.

2. The optical sensor of claim 1 wherein the optical receiver is a photosensitive device generating a signal responsive to the intensity of the incident light.

3. The optical sensor of claim 1 wherein the optical receiver is an array of photosensitive devices each photosensitive device generating a signal corresponding to light incident on that device.

4. The optical sensor of claim 1 wherein the logic circuit is further configured to:
control the optical source to emit the radiation at a first periodic interval;
perform the above identified steps (a)-(d) at the first periodic interval; and
receive at least one signal from the optical receiver corresponding to the radiation received by the optical receiver at a second periodic interval interspersed with the first periodic interval.

5. The optical sensor of claim 1 further comprising a reference target mounted within the housing, wherein the optical source is positioned to emit radiation toward the reference target which is reflected toward and received by the portion of the optical receiver configured to receive the radiation.

6. The optical sensor of claim 5 wherein:
the housing includes:
a front wall having an interior and an exterior surface,
a rear wall generally opposite the front wall, and
an opening extending through the front wall;
the optical receiver is mounted on a substrate located proximate to the rear wall and opposite the opening in the front wall; and
the reference target is mounted on the interior surface of the front wall.

7. The optical sensor of claim 6 wherein the optical source is mounted opposite the reference target and generally coplanar to the substrate.

8. The optical sensor of claim 7 wherein the optical source is mounted on the substrate with the optical receiver.

9. The optical sensor of claim 7 wherein the optical source emits radiation through an opening in the substrate.

10. The optical sensor of claim 7 wherein the optical source is selected from one of a light emitting diode, an infrared diode, and a laser diode.

11. A method of verifying operation of an optical sensor used in a safety system, the optical sensor having a plurality of receiving elements mounted within a housing, comprising the steps of:
mounting a light source within the housing, wherein the light source emits radiation at a wavelength;
emitting the radiation from the light source at a first periodic interval,
receiving the radiation at a first portion of the receiving elements;
determining a value corresponding to either a time for the light to travel from the light source to the first portion of the receiving elements or a distance between the light source and the first portion of the receiving elements as a function of the radiation received, from the first portion of the receiving elements;
comparing the value to a predetermined threshold; and
generating a signal if the value exceeds the predetermined threshold.

12. The method of claim 11 wherein the receiving elements are located on a substrate, further comprising the steps of:
mounting the light source proximate to the first portion of receiving elements; and
locating a reference target on an interior surface of the housing generally opposite the light source, wherein the first portion of receiving elements is selected to receive light emitted from the light source and reflected back from the reference target.

13. The method of claim 11 further comprising the step of generating a signal corresponding to light incident on a second portion of the receiving elements at a second periodic interval, wherein the second portion of receiving elements is proximate to the first portion.

14. The method of claim 13 further comprising the step of compensating the value as a function of the radiation received at the second portion of receiving elements.

15. An optical sensor system for use in a safety system, comprising
a first light source configured to transmit light in a defined path;
an optical sensor unit including:
a housing having an opening positioned to receive light from the first light source either directly along the defined path or reflected from an object passing through the defined path,
an array of receiving elements mounted within the housing to receive the light entering through the opening,
a reference target interior to the housing and adjacent to the opening, and
a test light source configured to transmit light toward the reference target, which in turn reflects the light toward a portion of the array of receiving elements; and
a controller in communication with each of the first light source, the test light source, and the array of receiving elements and configured to:
periodically transmit light from at least one of the first light source and the test light source,
detect the presence of the light from either the first light source or the test light source at the array of receiving elements,
determine whether an object exists in the defined path if the first light source is transmitting, and
evaluate performance of the array of receiving elements as a function of the light transmitted from the test light source if the test light source is transmitting.

16. The optical sensor system of claim 15 wherein the controller evaluates performance of the array of receiving elements by determining a value corresponding to either a time for the light to travel from the test light source to the portion of the array or a distance between the light source and the portion of the array as a function of the light transmitted from the test, light source and incident on the portion of the array.

17. The optical sensor system of claim 15 wherein the defined path is one of a beam and a plane.

18. The optical sensor system of claim 15 wherein the test light source is mounted substantially aligned with the array of receiving elements.

19. The optical sensor system of claim 15 wherein the test light source emits radiation at a defined wavelength.

20. The optical sensor system of claim 19 wherein the controller evaluates performance of the array of receiving elements by determining a value corresponding to a phase shift between the radiation emitted from the test light source and the radiation received at the portion of the array.

* * * * *